US008635661B2

(12) United States Patent
Shahbazi

(10) Patent No.: US 8,635,661 B2
(45) Date of Patent: Jan. 21, 2014

(54) SYSTEM AND METHOD FOR ENFORCING A SECURITY POLICY ON MOBILE DEVICES USING DYNAMICALLY GENERATED SECURITY PROFILES

(75) Inventor: Majid Shahbazi, Fairfax, VA (US)

(73) Assignee: McAfee, Inc., Santa Clara, CA (US)

( * ) Notice: Subject to any disclaimer, the term of this patent is extended or adjusted under 35 U.S.C. 154(b) by 1207 days.

(21) Appl. No.: 11/578,420

(22) PCT Filed: Dec. 22, 2004

(86) PCT No.: PCT/US2004/042565
§ 371 (c)(1),
(2), (4) Date: Oct. 13, 2006

(87) PCT Pub. No.: WO2005/064498
PCT Pub. Date: Jul. 14, 2005

(65) Prior Publication Data
US 2007/0143824 A1    Jun. 21, 2007

Related U.S. Application Data

(60) Provisional application No. 60/531,668, filed on Dec. 23, 2003.

(51) Int. Cl.
*G06F 17/00* (2006.01)
(52) U.S. Cl.
USPC .................................. 726/1; 380/270; 726/26
(58) Field of Classification Search
USPC ........................ 726/1, 26; 380/270; 455/410
See application file for complete search history.

(56) References Cited

U.S. PATENT DOCUMENTS

| | | | |
|---|---|---|---|
| 5,727,202 A | 3/1998 | Kucala | |
| 5,884,323 A | 3/1999 | Hawkins et al. | |
| 5,987,610 A | 11/1999 | Franczek et al. | |
| 6,000,000 A | 12/1999 | Hawkins et al. | |
| 6,006,274 A | 12/1999 | Hawkins et al. | |

(Continued)

FOREIGN PATENT DOCUMENTS

| | | |
|---|---|---|
| AU | 2003260071 | 3/2004 |
| EP | 0661677 | 7/1995 |

(Continued)

OTHER PUBLICATIONS

Smith, Randy F., "Tracking Logon and Logoff Activity in Windows 2000", Feb. 2001, Microsoft TechNet, http://www.microsoft.com/technet/prodtechnol/windows2000serv/maintain/monitor/logonoff.mspx (printed Jul. 1, 2010, © 2010).

(Continued)

*Primary Examiner* — Samson Lemma
(74) *Attorney, Agent, or Firm* — Patent Capital Group

(57) ABSTRACT

A system and method for enforcing security parameters that collects information from a source relating to a mobile device (104). Based on the collected information, an identity status for the mobile device (104) is determined that uniquely identifies the mobile device (104) and distinguishes it from other mobile devices. The identity status of the mobile device (104) can be determined when the mobile device (104) connects to a computing node source (102) or when the mobile device (104) accesses a resource (124) within the network. A security profile based on the identity status of the mobile device (104) is generated and the security profile is applied to the mobile device (104).

19 Claims, 7 Drawing Sheets

(56) References Cited

U.S. PATENT DOCUMENTS

| | | | |
|---|---|---|---|
| 6,073,142 A | 6/2000 | Geiger et al. | |
| 6,158,010 A | 12/2000 | Moriconi et al. | |
| 6,301,484 B1 | 10/2001 | Rogers et al. | |
| 6,317,868 B1 | 11/2001 | Grimm et al. | |
| 6,460,050 B1 | 10/2002 | Pace et al. | |
| 6,661,780 B2 | 12/2003 | Li | |
| 6,678,827 B1 | 1/2004 | Rothermel | |
| 6,684,244 B1 | 1/2004 | Goldman et al. | |
| 6,694,434 B1 | 2/2004 | McGee et al. | |
| 6,766,165 B2 | 7/2004 | Sharma et al. | |
| 6,798,757 B2 | 9/2004 | Mizutani | |
| 6,804,722 B1 | 10/2004 | Nishi | |
| 6,839,766 B1 | 1/2005 | Parnafes et al. | |
| 6,944,183 B1 | 9/2005 | Iyer et al. | |
| 6,954,790 B2 | 10/2005 | Forslow | |
| 6,973,488 B1 | 12/2005 | Yavatkar et al. | |
| 7,003,562 B2 | 2/2006 | Mayer | |
| 7,089,592 B2 | 8/2006 | Adjaoute | |
| 7,103,772 B2 | 9/2006 | Jorgensen et al. | |
| 7,136,645 B2 | 11/2006 | Hanson et al. | |
| 7,136,907 B1 | 11/2006 | Nordstrom et al. | |
| 7,194,689 B2 | 3/2007 | Manni et al. | |
| 7,222,359 B2 | 5/2007 | Freund et al. | |
| 7,249,369 B2 | 7/2007 | Knouse et al. | |
| 7,308,703 B2 | 12/2007 | Wright et al. | |
| 7,317,699 B2 | 1/2008 | Godfrey et al. | |
| 7,346,340 B2 | 3/2008 | Purnadi et al. | |
| 7,386,888 B2 | 6/2008 | Liang et al. | |
| 7,428,583 B1 | 9/2008 | Lortz et al. | |
| 7,448,067 B2 | 11/2008 | Yadav | |
| 7,506,155 B1 | 3/2009 | Stewart et al. | |
| 7,546,629 B2 | 6/2009 | Albert et al. | |
| 7,562,388 B2 | 7/2009 | Hackenberger et al. | |
| 7,574,208 B2 | 8/2009 | Hanson et al. | |
| 7,665,118 B2 | 2/2010 | Mann et al. | |
| 7,669,237 B2 | 2/2010 | Shahbazi | |
| 7,734,284 B2 * | 6/2010 | Adams et al. | 455/418 |
| 7,774,363 B2 | 8/2010 | Lim | |
| 7,774,504 B2 | 8/2010 | Chene et al. | |
| 7,853,998 B2 | 12/2010 | Blaisdell et al. | |
| 7,865,938 B2 | 1/2011 | Shahbazi | |
| 7,971,232 B2 | 6/2011 | Hasbun | |
| 8,010,997 B2 | 8/2011 | Limont et al. | |
| 8,131,851 B2 | 3/2012 | Harlow | |
| 8,134,954 B2 | 3/2012 | Godfrey et al. | |
| 8,259,568 B2 | 9/2012 | Laudermilch et al. | |
| 8,259,611 B2 | 9/2012 | Godfrey et al. | |
| 8,341,693 B2 | 12/2012 | Shahbazi | |
| 8,495,700 B2 | 7/2013 | Shahbazi | |
| 2001/0039624 A1 * | 11/2001 | Kellum | 713/201 |
| 2001/0041576 A1 | 11/2001 | I'Anson et al. | |
| 2002/0027569 A1 | 3/2002 | Manni et al. | |
| 2002/0032853 A1 | 3/2002 | Preston et al. | |
| 2002/0068559 A1 | 6/2002 | Sharma et al. | |
| 2002/0098830 A1 | 7/2002 | Lauper et al. | |
| 2002/0098840 A1 | 7/2002 | Hanson et al. | |
| 2002/0120599 A1 | 8/2002 | Knouse et al. | |
| 2002/0184532 A1 | 12/2002 | Hackenberger et al. | |
| 2002/0194317 A1 | 12/2002 | Kanada et al. | |
| 2003/0028651 A1 | 2/2003 | Schreckengast et al. | |
| 2003/0037129 A1 | 2/2003 | Beadles et al. | |
| 2003/0081621 A1 | 5/2003 | Godfrey et al. | |
| 2003/0108015 A1 | 6/2003 | Li | |
| 2003/0130953 A1 | 7/2003 | Narasimhan et al. | |
| 2003/0140246 A1 | 7/2003 | Kammer et al. | |
| 2003/0162555 A1 | 8/2003 | Loveland | |
| 2003/0167405 A1 | 9/2003 | Freund et al. | |
| 2003/0177389 A1 | 9/2003 | Albert et al. | |
| 2003/0182394 A1 | 9/2003 | Ryngler et al. | |
| 2003/0228866 A1 | 12/2003 | Pezeshki | |
| 2004/0009768 A1 | 1/2004 | Waters et al. | |
| 2004/0022258 A1 | 2/2004 | Tsukada et al. | |
| 2004/0030705 A1 | 2/2004 | Bowman-Amuah | |
| 2004/0030796 A1 | 2/2004 | Cooper et al. | |
| 2004/0043762 A1 * | 3/2004 | Kim et al. | 455/418 |
| 2004/0054739 A1 | 3/2004 | Friend et al. | |
| 2004/0064727 A1 | 4/2004 | Yadav | |
| 2004/0076128 A1 | 4/2004 | Rao et al. | |
| 2004/0083382 A1 | 4/2004 | Markham et al. | |
| 2004/0123150 A1 | 6/2004 | Wright et al. | |
| 2004/0128394 A1 | 7/2004 | Knauerhase et al. | |
| 2004/0179690 A1 | 9/2004 | Soliman | |
| 2004/0214570 A1 | 10/2004 | Zhang et al. | |
| 2004/0225524 A1 | 11/2004 | Narasimhan et al. | |
| 2004/0266395 A1 | 12/2004 | Pailles et al. | |
| 2004/0268145 A1 | 12/2004 | Watkins et al. | |
| 2005/0022012 A1 | 1/2005 | Bluestone et al. | |
| 2005/0055578 A1 | 3/2005 | Wright et al. | |
| 2005/0060393 A1 | 3/2005 | Parnafes et al. | |
| 2005/0097199 A1 | 5/2005 | Woodard et al. | |
| 2005/0101293 A1 | 5/2005 | Mentze et al. | |
| 2005/0135375 A1 | 6/2005 | Hurtta et al. | |
| 2005/0164691 A1 | 7/2005 | Payne | |
| 2005/0198306 A1 | 9/2005 | Palojarvi et al. | |
| 2005/0203881 A1 | 9/2005 | Sakamoto et al. | |
| 2005/0251853 A1 | 11/2005 | Bhargavan et al. | |
| 2005/0254652 A1 * | 11/2005 | Engler et al. | 380/270 |
| 2005/0255838 A1 | 11/2005 | Adams et al. | |
| 2005/0257246 A1 | 11/2005 | Adams et al. | |
| 2005/0262343 A1 | 11/2005 | Jorgensen et al. | |
| 2005/0268326 A1 | 12/2005 | Bhargavan et al. | |
| 2006/0005254 A1 | 1/2006 | Ross | |
| 2006/0031351 A1 | 2/2006 | Marston et al. | |
| 2006/0036730 A1 | 2/2006 | Graham et al. | |
| 2006/0075472 A1 | 4/2006 | Sanda et al. | |
| 2006/0089938 A1 | 4/2006 | Leonard et al. | |
| 2006/0095953 A1 | 5/2006 | Frank | |
| 2006/0112427 A1 | 5/2006 | Shahbazi | |
| 2006/0130139 A1 | 6/2006 | Sobel et al. | |
| 2006/0141995 A1 | 6/2006 | Purnadi et al. | |
| 2006/0161646 A1 | 7/2006 | Chene et al. | |
| 2006/0184490 A1 | 8/2006 | Heim et al. | |
| 2006/0190684 A1 | 8/2006 | McCammon et al. | |
| 2006/0190984 A1 | 8/2006 | Heard et al. | |
| 2006/0224742 A1 | 10/2006 | Shahbazi | |
| 2006/0277590 A1 | 12/2006 | Limot et al. | |
| 2007/0006289 A1 | 1/2007 | Limot et al. | |
| 2007/0088948 A1 | 4/2007 | Ji et al. | |
| 2007/0156670 A1 | 7/2007 | Lim | |
| 2007/0156694 A1 | 7/2007 | Lim | |
| 2007/0157287 A1 | 7/2007 | Lim | |
| 2007/0157288 A1 | 7/2007 | Lim | |
| 2007/0169168 A1 | 7/2007 | Lim | |
| 2007/0186275 A1 | 8/2007 | Shahbazi | |
| 2007/0266422 A1 | 11/2007 | Germano et al. | |
| 2008/0034401 A1 | 2/2008 | Wang | |
| 2008/0052383 A1 | 2/2008 | O'Shaughnessy et al. | |
| 2008/0065700 A1 | 3/2008 | Lim | |
| 2008/0066149 A1 | 3/2008 | Lim | |
| 2008/0070495 A1 | 3/2008 | Stricklen et al. | |
| 2008/0098062 A1 | 4/2008 | Balia | |
| 2008/0125102 A1 | 5/2008 | Abel et al. | |
| 2008/0137593 A1 | 6/2008 | Laudermilch et al. | |
| 2008/0184200 A1 | 7/2008 | Burns et al. | |
| 2008/0184201 A1 | 7/2008 | Burns et al. | |
| 2008/0184277 A1 | 7/2008 | Burns et al. | |
| 2008/0209505 A1 | 8/2008 | Ghai et al. | |
| 2009/0049166 A1 | 2/2009 | Roman et al. | |
| 2009/0049518 A1 | 2/2009 | Roman et al. | |
| 2009/0138939 A1 | 5/2009 | Kumar et al. | |
| 2009/0164560 A1 | 6/2009 | Fiatal | |
| 2009/0265754 A1 | 10/2009 | Hinds | |
| 2009/0298478 A1 | 12/2009 | Tyhurst et al. | |
| 2009/0322890 A1 | 12/2009 | Bocking et al. | |
| 2010/0037088 A1 | 2/2010 | Krivopaltsev et al. | |
| 2010/0064341 A1 | 3/2010 | Aldera | |
| 2010/0112983 A1 | 5/2010 | Walker et al. | |
| 2010/0115581 A1 | 5/2010 | Goldschlag et al. | |
| 2010/0115582 A1 | 5/2010 | Sapp et al. | |
| 2010/0154025 A1 | 6/2010 | Balducci et al. | |
| 2010/0191847 A1 | 7/2010 | Raleigh | |
| 2011/0004913 A1 | 1/2011 | Nagarajan et al. | |
| 2011/0162049 A1 | 6/2011 | Shahbazi | |
| 2011/0167470 A1 | 7/2011 | Walker et al. | |

(56) References Cited

U.S. PATENT DOCUMENTS

| | | | |
|---|---|---|---|
| 2011/0276683 | A1 | 11/2011 | Goldschlag et al. |
| 2011/0320819 | A1 | 12/2011 | Weber et al. |
| 2012/0270522 | A1 | 10/2012 | Laudermilch et al. |
| 2012/0270523 | A1 | 10/2012 | Laudermilch et al. |
| 2013/0047219 | A1 | 2/2013 | Shahbazi |

FOREIGN PATENT DOCUMENTS

| | | | |
|---|---|---|---|
| EP | 1041506 | | 10/2000 |
| EP | 1540446 | | 6/2005 |
| EP | 1709556 | | 7/2005 |
| EP | 1866789 | | 12/2007 |
| EP | 2345205 | | 7/2011 |
| GB | 1 496 984 | A | 12/1975 |
| WO | WO 02/19116 | A2 | 3/2002 |
| WO | WO 02/44892 | | 6/2002 |
| WO | WO 03/027878 | A1 | 4/2003 |
| WO | WO 03/090492 | A1 | 10/2003 |
| WO | WO 2004/021114 | A2 | 3/2004 |
| WO | WO 2004/057834 | A2 | 7/2004 |
| WO | WO2005064498 | | 7/2005 |
| WO | WO2005107144 | | 11/2005 |
| WO | WO 2006/093917 | A2 | 9/2006 |
| WO | WO 2007/073278 | A2 | 6/2007 |
| WO | WO 2008/109866 | | 9/2008 |
| WO | WO 2010/054258 | A1 | 5/2010 |

OTHER PUBLICATIONS

International Search Report for International Application No. PCT/US03/26645 mailed Feb. 13, 2004 (3 pages).
International Preliminary Examination Report for International Application No. PCT/US03/26645 completed Mar. 3, 2005 (6 pages).
Written Opinion of the International Searching Authority for International Application No. PCT/US04/42565 mailed May 25, 2005 (6 pages).
International Search Report for International Application No. PCT/US04/42565 mailed May 25, 2005 (1 page).
"Face-Image Capturing Method for Unattended Terminal", IBM Technical Disclosure Bulletin, IBM Corporation, New York, US, vol. 38, No. 1, Jan. 1995, pp. 101-102, XP000498703 ISSN: 0018-8689.
International Search Report for International Application No. PCT/US06/06968 mailed Feb. 29, 2008 (1 page).
International Preliminary Report on Patentability issued Mar. 24, 2009 (1 page) and Written Opinion of the International Searching Authority mailed Feb. 29, 2008 (4 pages) for International Application No. PCT/US06/06968.
International Search Report for International Application No. PCT/US2009/063640 mailed Apr. 20, 2010 (6 pages).
Supplementary European Search Report for EPO Application No. EP 04 81 4713 completed Apr. 25, 2007.
U.S. Appl. No. 12/972,410, filed Dec. 17, 2010, entitled "Enterprise-Wide Security System for Computer Devices," Inventor Majid Shahbazi.
International Search Report and Written Opinion for International Application No. PCT/US2009/063640 mailed Apr. 20, 2010 (6 pages).
USPTO Aug. 6, 2010 Nonfinal Office Action from U.S. Appl. No. 11/877,656.
USPTO Nov. 8, 2010 Response to Aug. 6, 2010 Nonfinal Office Action from U.S. Appl. No. 11/877,656.
USPTO Mar. 1, 2011 Final Office Action from U.S. Appl. No. 11/877,656.
USPTO Jun. 1, 2011 RCE Response to Mar. 1, 2011 Final Office Action from U.S. Appl. No. 11/877,656.
USPTO Jun. 2, 2009 Nonfinal Office Action from U.S. Appl. No. 11/363,283.
USPTO Oct. 2, 2009 Response to Jun. 2, 2009 Nonfinal Office Action from U.S. Appl. No. 11/363,283.
USPTO Jan. 5, 2010 Final Office Action from U.S. Appl. No. 11/363,283.
USPTO Jul. 6, 2010 RCE Response to Jan. 5, 2010 Final Office Action from U.S. Appl. No. 11/363,283.
USPTO Sep. 23, 2010 Office Action from U.S. Appl. No. 11/363,283.
USPTO Dec. 20, 2010 Response to Sep. 23, 2010 Nonfinal Office Action from U.S. Appl. No. 11/363,283.
USPTO Mar. 9, 2011 Final Office Action from U.S. Appl. No. 11/363,283.
May 19, 2011 International Preliminary Report on Patentability for International Application No. PCT/US2009/063640.
May 30, 2011 Replacement International Search Report for Application No. 04814713.6-1238/1709556.
Replacement International Search Report for Application No. 04814713.6-1238/1709556 mailed on May 30, 2011.
International Preliminary Report on Patentability for International Application No. PCT/US2009/063640 mailed on May 19, 2011.
European Patent Office Action dated Jun. 15, 2011 in EP Application No. 09759830.4-1244 PCT/US2009063640.
Non-Final Office Action in U.S. Appl. No. 10/527,235 mailed on Jun. 28, 2006.
Response to Non-Final Office Action dated Jun. 28, 2006 in U.S. Appl. No. 10/527,235, filed Sep. 28, 2006.
Final Office Action in U.S. Appl. No. 10/527,235 mailed on Dec. 12, 2006.
Request for Continued Examination and Amendment in U.S. Appl. No. 10/527,235, filed Jun. 12, 2007.
Non-Final Office Action in U.S. Appl. No. 10/527,235 mailed on Aug. 28, 2007.
Response to Non-Final Office Action dated Aug. 28, 2007 in U.S. Appl. No. 10/527,235, filed Feb. 28, 2008.
Final Office Action in U.S. Appl. No. 10/527,235 mailed on Jul. 11, 2008.
Request for Continued Examination and Amendment in U.S. Appl. No. 10/527,235, filed Dec. 11, 2008.
Non-Final Office Action in U.S. Appl. No. 10/527,235 mailed on Jan. 9, 2009.
Response to Non-Final Office Action dated Jan. 9, 2009 in U.S. Appl. No. 10/527,235, filed Jul. 9, 2009.
Notice of Allowance in U.S. Appl. No. 10/27,235 mailed on Oct. 5, 2009.
Non-Final Office Action in U.S. Appl. No. 11/441,049 mailed on Oct. 17, 2006.
Response to Non-Final Office Action dated Oct. 17, 2006 in U.S. Appl. No. 11/441,049, filed Jan. 17, 2007.
Final Office Action in U.S. Appl. No. 11/441,049 mailed on Mar. 22, 2007.
Request for Continued Examination and Amendment in U.S. Appl. No. 11/441,049, filed Jun. 22, 2007.
Non-Final Office Action in U.S. Appl. No. 11/441,049 mailed on Sep. 24, 2007.
Response to Non-Final Office Action dated Sep. 24, 2007 in U.S. Appl. No. 11/441,049, filed Mar. 24, 2008.
Final Office Action in U.S. Appl. No. 11/441,049 mailed on Jul. 9, 2008.
Request for Continued Examination and Amendment in U.S. Appl. No. 11/441,049, filed Jan. 9, 2009.
Non-Final Office Action in U.S. Appl. No. 11/441,049 mailed on Feb. 2, 2009.
Examiner Interview Summary in U.S. Appl. No. 11/441,049 mailed on Jul. 27, 2009.
Response to Non-Final Office Action dated Feb. 2, 2009 in U.S. Appl. No. 11/441,049, filed Aug. 27, 2009.
Non-Final Office Action in U.S. Appl. No. 11/441,049 mailed on Dec. 10, 2009.
Response to Non-Final Office Action dated Dec. 10, 2009 in U.S. Appl. No. 11/441,049, filed Jun. 10, 2010.
Examiner Interview Summary in U.S. Appl. No. 11/441,049 mailed on Jun. 14, 2010.
Notice of Allowance in U.S. Appl. No. 11/441,049 mailed on Aug. 23, 2010.
Requested for Continued Examination and Amendment in U.S. Appl. No. 11/363,283, filed Jun. 9, 2011.

(56) References Cited

OTHER PUBLICATIONS

Non-Final Office Action in U.S. Appl. No. 11/363,283 mailed on Aug. 17, 2011.
Notice of Allowance in U.S. Appl. No. 11/877,656 mailed on Jul. 12, 2011.
U.S. Appl. No. 12/830,831, filed Jul. 6, 2011.
Non-Final Office Action in U.S. Appl. No. 12/614,333 mailed on Mar. 28, 2012.
Final Office Action in U.S. Appl. No. 12/972,410 mailed on Mar. 7, 2012.
Notice of Allowance in U.S. Appl. No. 11/877,656 mailed on Jan. 24, 2012.
Request for Continued Examination in U.S. Appl. No. 11/877,656, filed Mar. 14, 2012.
Response to Non-Final Office Action in U.S. Appl. No. 12/614,326, filed Mar. 16, 2012.
U.S. Appl. No. 12/830,861, filed Jul. 6, 2010 and entitled "Mobile Data Security System and Methods".
Request for Continued Examination in U.S. Appl. No. 12/972,410, filed Sep. 23, 2012.
Notice of Allowance in U.S. Appl. No. 12/972,410 mailed on Oct. 17, 2012.
U.S. Appl. No. 13/630,830, filed Sep. 28, 2012 entitled "Enterprise-Wide Security System for Computer Devices", Inventor, Majid Shahbazi.
Non-Final Office Action in U.S. Appl. No. 13/459,213 mailed on Dec. 17, 2012.
Non-Final Office Action in U.S. Appl. No. 13/459,216 mailed on Dec. 7, 2012.
Final Office Action in U.S. Appl. No. 12/614,319 mailed on Sep. 20, 2012.
Request for Continued Examination and Amendment in U.S. Appl. No. 12/614,319, filed Nov. 28, 2012.
Non-Final Office Action in U.S. Appl. No. 12/614,326 mailed on Dec. 12, 2012.
Request for Continued Examination and Amendment in U.S. Appl. No. 12/614,333, filed Nov. 1, 2012.
Request for Continued Examiation and Amedment in U.S. Appl. No. 11/441,049, filed Aug. 14, 2012.
Request for Continued Examination and Amendment in U.S. Appl. No. 12/972,410, filed Jun. 7, 2012.
Notice of Allowance in U.S. Appl. No. 12/972,410 mailed on Jun. 25, 2012.
Request for Continued Examination and Amendment in U.S. Appl. No. 11/363,283, filed Apr. 29, 2012.
Notice of Allowance in U.S. Appl. No. 11/877,656 mailed on Mar. 29, 2012.
Request for Continued Examination in U.S. Appl. No. 11/877,656, filed Jun. 29, 2012.
Notice of Allowance in U.S. Appl. No. 11/877,656 mailed on Jul. 20, 2012.
U.S. Appl. No. 13/459,213, filed Apr. 29, 2012, entitled "System and Method for Controlling Mobile Device Access to a Network"; inventors Norm Laudermilch et al.
U.S. Appl. No. 13/459,216, filed Apr. 29, 2012, entitled "System and Method for Controlling Mobile Device Access to a Network"; inventors Norm Laudermilch et al.
Non-Final Office Action in U.S. Appl. No. 12/614,319 mailed on Apr. 19, 2012.
Response to Non-Final Office Action dated Apr. 19, 2012 in U.S. Appl. No. 12/614,319, filed Jun. 22, 2012.
Final Office Action in U.S. Appl. No. 12/614,333 mailed on Aug. 1, 2012.
Final Office Action in U.S. Appl. No. 12/614,326 mailed on May 10, 2012.
Request for Continued Examination and Amendment in U.S. Appl. No. 12/614,326, filed Aug. 10, 2012.
Response to Non-Final Office Action dated Mar. 28, 2012 in U.S. Appl. No. 12/614,333, filed May 29, 2012.
Non-Final Office Action in U.S. Appl. No. 12/830,861 in U.S. Appl. No. 12/830,861 mailed on Jun. 21, 2012.
"Can You Manage an iPhone Like a BlackBerry?", Network World Middle East, Copyright IDG Middle East, Jul. 9, 2009 (3 pages).
"GuardianEdge Releases Smartphone Protection Product", ComputerTechnology Review, Nov. 28, 2007 (1 page).
PCT Written Opinion in International Application U.S. Appl. No. PCT/US03/26645 mailed on Jan. 21, 2005 (7 pages).
European Patent Office Communication Pursuant to Article 94(3) EPC (Examination Report) dated Sep. 29, 2011 in EP Application No. 04814713.6.
Non-Final Office Action in U.S. Appl. No. 12/972,410 mailed on Sep. 21, 2011.
Response to Non-Final Office Action in U.S. Appl. No. 12/972,410, filed Dec. 21, 2011.
Response to Non-Final Office Action dated Aug. 17, 2011 in U.S. Appl. No. 11/363,283, filed Nov. 17, 2011.
Final Office Action in U.S. Appl. No. 11/363,283 mailed on Jan. 30, 2012.
Request for Continued Examination and Amendment in U.S. Appl. No. 11/877,656, filed Sep. 22, 2011.
Notice of Allowance in U.S. Appl. No. 11/877,656 mailed on Oct. 5, 2011.
Request for Continued Examination in U.S. Appl. No. 11/877,656, filed Jan. 4, 2012.
Notice of Allowance in U.S. Appl. No. 11/877,565 mailed on Jan. 24, 2012.
Non-Final Office Action in U.S. Appl. No. 12/614,326 mailed on Dec. 16, 2011.
U.S. Appl. No. 13/102,627, filed May 6, 2011.
Nayak, et al., "Security Issues in Mobile Data Networks," Vehicular Technology Conference, 2004; VTC2004-Fall 2004; IEEE 60th., vol. 5, pp. 3229-3233.
Request for Continued Examination and Amendment in U.S. Appl. No. 11/578,420, filed Apr. 18, 2013.
Notice of Allowance in U.S. Appl. No. 11/363,283 mailed on Jan. 7, 2013.
Request for Continued Examination in U.S. Appl. No. 13/363,283, filed Apr. 8, 2013.
Response to Non-Final Office Action dated Dec. 17, 2012 in U.S. Appl. No. 13/459,213, filed Mar. 18, 2013.
Response to Non-Final Office Action dated Dec. 7, 2012 in U.S. Appl. No. 13/459,216, filed Mar. 7, 2013.
Final Office Action in U.S. Appl. No. 13/459,216 mailed on Mar. 26, 2013.
Response to Non-Final Office Action dated Dec. 12, 2012 in U.S. Appl. No. 12/614,326, filed Mar. 8, 2013.
Notice of Allowance in U.S. Appl. No. 12/614,326 mailed on Mar. 19, 2013.
Notice of Allowance in U.S. Appl. No. 12/614,333 mailed on Mar. 5, 2013.
Non-Final Office Action in U.S. Appl. No. 13/102,627 mailed on Mar. 28, 2013.
Non-Final Office Action in U.S. Appl. No. 12/614,319 mailed on Feb. 7, 2013.
Response to Non-Final Office Action dated Jul. 2, 2013 in U.S. Appl. No. 12/614,319, filed May 7, 2013.
Request for Continued Examination in U.S. Appl. No. 11/363,283, filed Apr. 8, 2013.
Notice of Allowance in U.S. Appl. No. 11/363,283 mailed on May 24, 2013.
Final Office Action in U.S. Appl. No. 13/459,213 mailed on Jun. 11, 2013.
Response to Non-Final Office Action dated Feb. 7, 2013 in U.S. Appl. No. 12/614,319, filed May 7, 2013.
Request for Continued Examination in U.S. Appl. No. 12/614,333, filed Jun. 5, 2013.
Response to Non-Final Office Action dated Mar. 28, 2013 in U.S. Appl. No. 13/102,627, filed Jun. 17, 2013.
AF Response to Final Office Action dated Mar. 26, 2013 in U.S. Appl. No. 13/459,216, filed Jun. 26, 2013.
Request for Continued Examination in U.S. Appl. No. 12/614,326, filed Jun. 19, 2013.

(56) References Cited

OTHER PUBLICATIONS

Notice of Allowance in U.S. Appl. No. 12/614,326 mailed on Jul. 15, 2013.
Notice of Allowance in U.S. Appl. No. 12/614,333 mailed on Jul. 1, 2013.
European Patent Office Communication Pursuant to Article 94(3) EPC (Examination Report) dated Jul. 5, 2013 in EP Application No. 09759830.4.
Non-Final Office Action in U.S. Appl. No. 13/630,830 mailed on Aug. 26, 2013.
Request for Continued Examination and Amendment in U.S. Appl. No. 13/459,213, filed Sep. 11, 2013.
Advisory Action in U.S. Appl. No. 13/459,216 mailed on Jul. 19, 2013.
Final Office Action in U.S. Appl. No. 12/614,319 mailed on Aug. 7, 2013.
Notice of Allowance in U.S. Appl. No. 13/459,219 mailed on Oct. 9, 2013.
Final Office Action in U.S. Appl. No. 13/102,627 mailed on Sep. 26, 2013.

\* cited by examiner

```
<r_8F092CDD-DABB-452F-83E5-FC00849D74C7>
 <PolicyEditor>
  <IsCommonPolicy value="true" />
  <DeviceType value="Pocket PC" />
  <CreationStamp value="2003-08-26 17:34:46" />
  <UserName value="Pocket PC" />
  <hotSyncName value="Pocket PC" />
  <Version value="21" />
  <MagicValue value="1004695628" />
  <SerialNumber value="N-082603AUVP2082" />
  <AdminPassword value="[1]" />
  <SessionKey value="ad21a791bed695fc300f07cfcc566518d3dbc68" />
  <NewAdminPassword value="[1]" />
  <ChangePassword value="false" />
  <ForceGlobalPasswordChange value="false" />
  <ExpirationPeriod value="0" />
  <MinPasswordLength value="1" />
  <FolderName value="SecureFolder" />
  <CryptoMethod value="RC4" />
  <StorageSize value="65536" />
  <UserCanSeeSettings value="true" />
  <RestrictionStartTime value="0" />
  <RestrictionEndTime value="0" />
  <PasswordRestriction value="33686018" />
  <GlobalPasswordRestriction value="2" />
  <LocalPasswordRestriction value="2" />
  <BackdoorPasswordRestriction value="2" />
  <WipePasswordRestriction value="2" />
  <WorkingDays value="0" />
  <Company value="Trust Digital" />
  <Address value="" />
```

FIG. 3

SYSTEM AND METHOD FOR ENFORCING A SECURITY POLICY ON MOBILE DEVICES USING DYNAMICALLY GENERATED SECURITY PROFILES

CROSS-REFERENCE TO RELATED APPLICATIONS

This application is a U.S. National Stage Patent Application under 35 U.S.C. 371 of PCT International Patent Application Ser. No. PCT/US2004/042565 filed on Dec. 22, 2004, and entitled "SYSTEM AND METHOD FOR ENFORCING A SECURITY POLICY ON MOBILE DEVICES USING DYNAMICALLY GENERATED SECURITY PROFILES", which application in turn claims priority to U.S. Provisional Patent Application Ser. No. 60/531,668, filed on Dec. 23, 2003 and entitled "SYSTEM AND METHOD FOR SECURING DATA IN MOBILE COMPUTERS".

TECHNICAL FIELD

The present invention relates in general to the field of data security and more particularly to providing data security to mobile devices.

BACKGROUND

Recent advances in hardware and communication technologies have brought about the proliferation of powerful mobile devices ranging from notebook computers to much smaller personal digital assistants (PDAs) that operate over wired and wireless networks. The productivity enhancements associated with exponential growth of mobile technologies have fundamentally changed the security landscape—no longer are devices and data landlocked, the free flow and distribution of information to any place, at any time, to any device, creates a unique set of challenges which will continue to evolve. These mobile devices (also known as handheld devices) operate on various platforms, such as palm computing platform, Windows CE, etc. Other types of mobile devices include paging and messaging devices, laptop computers, data-capable smart phones, etc. These devices can provide users with network access connectivity, which allows them to be quickly notified of changing events, and provide them with the resources necessary to respond even when in transit. In this way, users can be given the power to access mission critical information in quick and reliable manner. For example, data generated by client applications running on a wide variety of mobile devices may be transported over networks having various access protocols and wired and wireless links. One such protocol is Transmission Control Protocol/Internet Protocol (TCP/IP), which is designed to connect computer systems that use different operating systems and network technologies. Many popular network applications have been built directly on top of TCP over the past decade, making TCP/IP a de-facto network access protocol standard.

Many personal computer users use Personal Information Management (PIM) applications such as an address book, a daily organizer, and a To-Do list application-on their personal computers and mobile devices. The data for these PIMS are stored in corresponding databases at the personal computers and mobile devices. Often, data in these databases must be synchronized in order to maintain data uniformity. The synchronization of data between devices of this type is known. For example, U.S. Pat. No. 6,006,274 describes a "Method and Apparatus Using a Pass Through Personal Computer Connected to Both a Local Communication Link and a Computer Network for Identifying and Synchronizing a Preferred Computer with a Portable Computer." Also, U.S. Pat. Nos. 6,000,000 and 5,884,323 both describe an "Extendible Method and Apparatus for Synchronizing Multiple Files on Two Different Computer Systems." Generally, the synchronization process is activated either by detecting a mobile device on a cradle or by the manual press of a button. The synchronization process proceeds to synchronize data for several different applications that run on the mobile devices with data for corresponding application on other computers.

As society continues to adopt handheld devices as a standard computing platform and applications become more powerful with the standardization of wired and wireless computing, security threats to data stored in and access by these types of mobile devices have become a serious concern and have created a heightened awareness and increased need for security. In fact, the U.S. Air Force Research Laboratory (AFRL), which develops some of the government's most advanced technologies, is crafting a policy to deal with security risks for data stored in mobile devices.

Various types of security software incorporating different data security encryption standards have been used in the past for securing network, desktop, laptop, and PDA environments. On such suit of software is called the Trusted Mobility Suite™ offered by Trust Digital™, which is used to set access control, encryption, and other parameters and push them to such mobile devices as Palm Pilot™, Pocket PC™, Blackberry™ or Symbian™ OS devices to protect against fraud, theft, sabotage, malicious hacking, and other adverse exposure caused by data compromise. Mobile DesktopSecure™ is a security and encryption software designed to protect files, data, applications, databases, directories, or an entire hard drive. It is also used to push security profiles containing defined security policies from a server to protect laptops and desktops within a network. Generally, Trusted Mobility Suite™ implements security using a graphical user interface (GUI) that allows administrators and users to secure all or selected applications. In this way, the users and administrators can selectively secure application(s) from unwanted and unauthorized access.

Trusted Mobility Suite™ manages data security for mobile devices at different levels. At a higher server level, Trusted Mobility Server™ deploys, manages, and secures networks containing mobile devices using a centralized management solution. A policy-profile editor is used to set security parameters for groups of users based on defined security policies. At a lower device level, PDASecure™ encrypts the data on the mobile device itself and offers security-management for those devices through the Trust Mobility Server. Once installed on a mobile device, PDASecure™ provides for universal integration with all available mobile devices on the network, without the requirement for moving data into separate, secured applications. Also, Trusted Mobility Software Development Kit™ allows software developers to incorporate Trust Digital's Mobility Framework, comprising security, encryption, and centralized rule-based management technologies into their products, for mobile/PDA users.

Also, U.S. Pat. No. 6,158,010 discloses a system and method for maintaining security in a distributed computing environment that comprises a policy manager located on a server for managing and distributing a security policy, and an application guard located on a client for managing access to securable components as specified by the security policy. A global policy specifies access privileges of the user to securable components. The policy manager may then preferably distribute a local client policy based on the global policy to the client. An application guard located on the client then manages access to the securable components as specified by the local policy.

Implementation of comprehensive security policies in networks that support a large number of mobile devices has become an important issue for many enterprises, particularly in view of the complexities associated with supporting various hardware and software platforms in terms of network architectures, protocols, device types, etc. Add to this complexity, the various situations under which data security may be breached, either on the network side or on the device side. Additionally, due to limited memory availability and fewer processing resources, creating security programs for mobile devices is much more complicated than with larger computers. There exists a need for an efficient and flexible system and method for securing data in mobile devices used under varying operating environments.

BRIEF DESCRIPTION OF DRAWINGS

FIG. 3 is an exemplary security profile for setting security parameters for the computing node and device.

SUMMARY OF THE INVENTION

Figure 1:
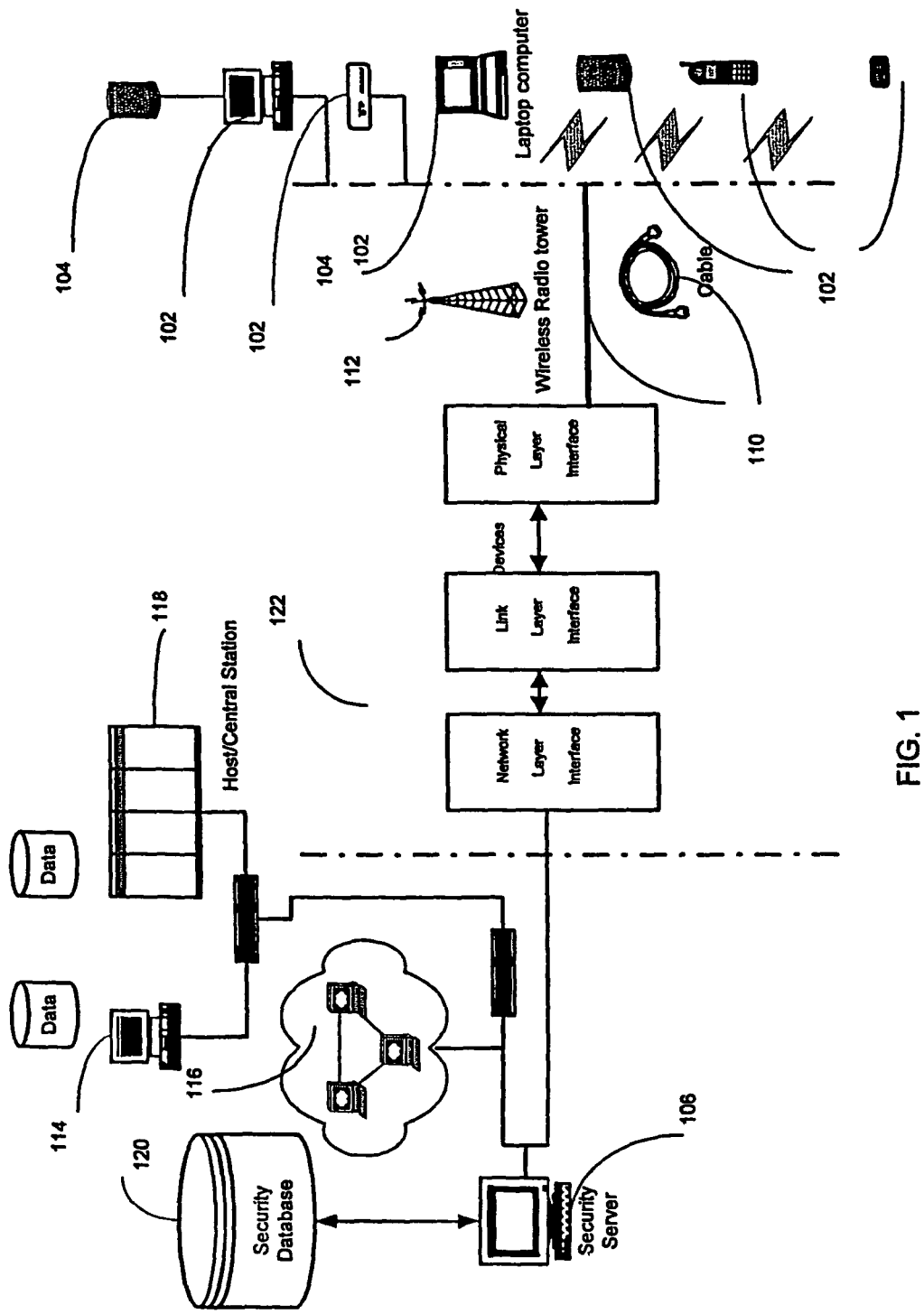
FIG. 1 is a diagram of a system that implements security control and management of the present invention.

Briefly, according to one aspect of the invention, a system and method for enforcing security parameters collects information from a source relating to a mobile device. The source can be an internal source to the mobile device or external source to the mobile device. In one embodiment, the source is a back-up source. Based on the collected information, an identity status for the mobile device is determined that uniquely identifies the mobile device and distinguishes it from other mobile devices similar to the way DNA information identifies an organism. The identity status of the mobile device can be determined when the mobile device connects to a computing node source or when the mobile device accesses a resource within the network. Thus, the identity status can correspond to a connection attribute between the mobile device and computing node or an access attribute to the resource. A security profile based on the identity status of the mobile device is generated and the security profile is applied to the mobile device. In another embodiment, the identity status of the mobile device is determined internal to the mobile device or external to the mobile device.

According to some of the more detailed features of this aspect of the invention, the collected information relates to static attributes of the device or dynamic attributes of the device. The static attributes of the mobile device could at least include physical device identification, device manufacturer, device model number, device serial number, input-output ports, and device capabilities. The dynamic attribute of the mobile device could at least include installed operating system, application, attached peripheral, usage pattern, historical activities, synchronization, location, network, communication link, domain, and security policies. The device security profile can include a parameter relating to protection of the mobile device, restriction on use of an internal resource and external resource, and configuration of a resource.

According to other more detailed features of this aspect of the invention, the mobile device is controlled according to a parameter in the device security profile that relates to an unauthorized resource in the mobile device. The mobile device can be controlled by deleting the unauthorized resource, hard or soft resetting the mobile device, locking the mobile device, preventing the unauthorized resource from running on the mobile device, deleting or removing one or more files that are associated with the unauthorized resource, and hiding the unauthorized resource. Moreover, the mobile device can be controlled according to a parameter that relates to an unauthorized external resource. The unauthorized external resource can be a computing node resource, an external application program, and an external database. Corresponding device security profiles for different identity statuses of the mobile device are administered by a security policy engine. The device security profile can be transferred, by wire or wirelessly, to the mobile device after access to the computing node is granted.

According to another aspect of the invention, a password protected mobile device associated with a security station is unlocked by authenticating the user of the mobile device and by authenticating the mobile device according to a device authentication code that is generated based on a device attribute that corresponds to a device identity status that uniquely identifies the mobile device. Upon authentication, an unlock code is generated that unlocks the password protected mobile device. The user can be authenticated by a user authentication response, a biometric parameter, or a security identification parameter. The user authentication response and the device authentication code can be communicated by the user or the mobile device. The unlock code can be communicated by the security station or an administrator.

According to yet another aspect of the invention, a mobile device is protected by transmitting a request from the mobile device in response to a security threat, such as a virus attack. In response to the request, a device security profile is created based on the security threat and is transmitted to the mobile device. The request includes information related to at least one or more of attributes of the mobile device, such as communication link used by the mobile device, serial number of the mobile device, location, software and hardware on the mobile device. The attributes of the mobile device can also relate to active directory information of the mobile device, including firewall settings of the mobile device, current security settings of the mobile device, and a security parameter of the mobile device.

According to still another aspect of the invention, a mobile device that connects to a computing node is protected by transmitting a login information that is the same for the computing node and the mobile device. When new computing node login information, such as new password, is set for the computing node, the new computing node login information is transmitted to the mobile device. According to one feature of this aspect of the present invention, the new computing node login is transmitted via a device security profile. The new computing node login information from the device security profile is retrieved at the mobile device and the new computing node login information is set as the new login information for the mobile device in order to eliminate the need for using multiple login information. The new computing node login information can be new network login information that is transmitted to the mobile device from a security station to set the new login information of the mobile device.

According to one more aspect of the invention, a network is protected by detecting access to one or more resources by a mobile device. Once detected, the mobile device is authenticated for access to the resources, and a device security profile is transmitted to the mobile device with rules for accessing the one or more resources. The one or more resources can be a communication resource, a data storage resource, a peripheral resource, or a wireless link resource.

According to yet one more aspect of the invention, a computing node that connects to different mobile devices is secured by applying security rules to the different mobile devices in accordance with corresponding device parameters contained in a security signature file. When a change is detected in device parameters of the mobile device, the security policies that are applied to the mobile device are modified in accordance with one or more device parameters of an updated security signature file at the computing node. The device parameters include serial number, security settings, manufacturer, and a model number.

DETAILED DESCRIPTION OF THE INVENTION

The present invention relates to a security and compliance framework that links all relevant security technologies to intelligently create and enforce security and data protection policies across the dynamic set of mobile devices and end points in a timeless, network and device independent manner, with low maintenance requirement.

The invention uses a data description method, a query language for understanding the data description and for applying rules to it, and an extensible enforcement structure for real-time policy enforcement that enables real-time analysis and enforcement of security and data protection policies based on an infinite number of environmental, physical, chronological and system parameters. This automates the application of sound security practices in a transparent way to eliminate accidental disclosures, internal threats, and ensure regulatory compliance with minimal impact to IT. Once implemented, the system manages the necessary changes based on existing practices and provides alerts based on predetermined event thresholds.

Referring to FIG. 1, an exemplary system 100 that advantageously implements the present invention is shown. The system of the invention supports security amongst computing nodes 102 and mobile devices 104, which are also referred to as user-devices. The computing nodes 102 can be any type of wired or wireless network node, a client station connected, a server station, a router, a hub, or an access point. The computing node 102 can also be a stand-alone computer. The computing node 102 possesses the processing power to execute programs and applications in accordance with the present invention. A security server 106 provides central functionality for implementing security parameters in accordance with the present invention. The computing node 102 can be connected to the computing node directly or via a network 122.

The mobile devices 104 can be of any type. For example, the present invention can support any handheld device, personal digital assistant, phone, smart phone, pager, etc., where various types of mobile devices operating within the system 100 can be discovered, located or detected for managing security.

Various types of data, files, and profiles can be transferred between the computing nodes 102 and mobile devices 104 over any supported transport, network, or link layer and physical connection. The transport protocol can be any suitable protocol, including TCP/IP, various telephony transport protocols, etc. The links can be wired or wireless links 110, 112. The wired links 110 can be twisted pair, coaxial cable, optical cable, etc. The wireless links 112 can support any protocols, such as IEEE 802.x, GSM, Bluetooth, etc.

In an exemplary embodiment, the system 100 is implemented over a network. The network includes server stations 114, client stations 116, and a host or central station 118 that are linked together by a set of standard or proprietary protocols either directly or via any collection of interconnected (public and/or private) networks, such as the Internet. The network can also support a website that serves informational content using the standard protocols of the World Wide Web. Typically, a website corresponds to a particular Internet domain name and includes the content associated with a particular organization. The system 100 also includes a guest network, for example, a separate Local Area network (LAN), used by guest mobile devices that do not belong to the network. This allows guests or visitors to access the guest wireless network without compromising the security of the entire network.

As shown in FIG. 1, the security server 106 can access a security database 120, which stores various data, including security profiles for the computing nodes 102 and mobile devices 104. The database 120 can also store collected and discovered information from computing nodes 102 and mobile devices 104, including historical information about the mobile devices, synchronization history, event log and audit log information, etc. The security station 106 communicates with the devices through a network layer interface 122. It should be noted that the present invention does not have to be implemented over a network. In fact, the present invention can use a computing node alone or as a part of a network. When the computing node is not connected to any network, the mobile device access between the computing node 102 and the mobile device 104 is an off-line access.

Managing Security between Computing Node and Mobile Devices

Figure 2:
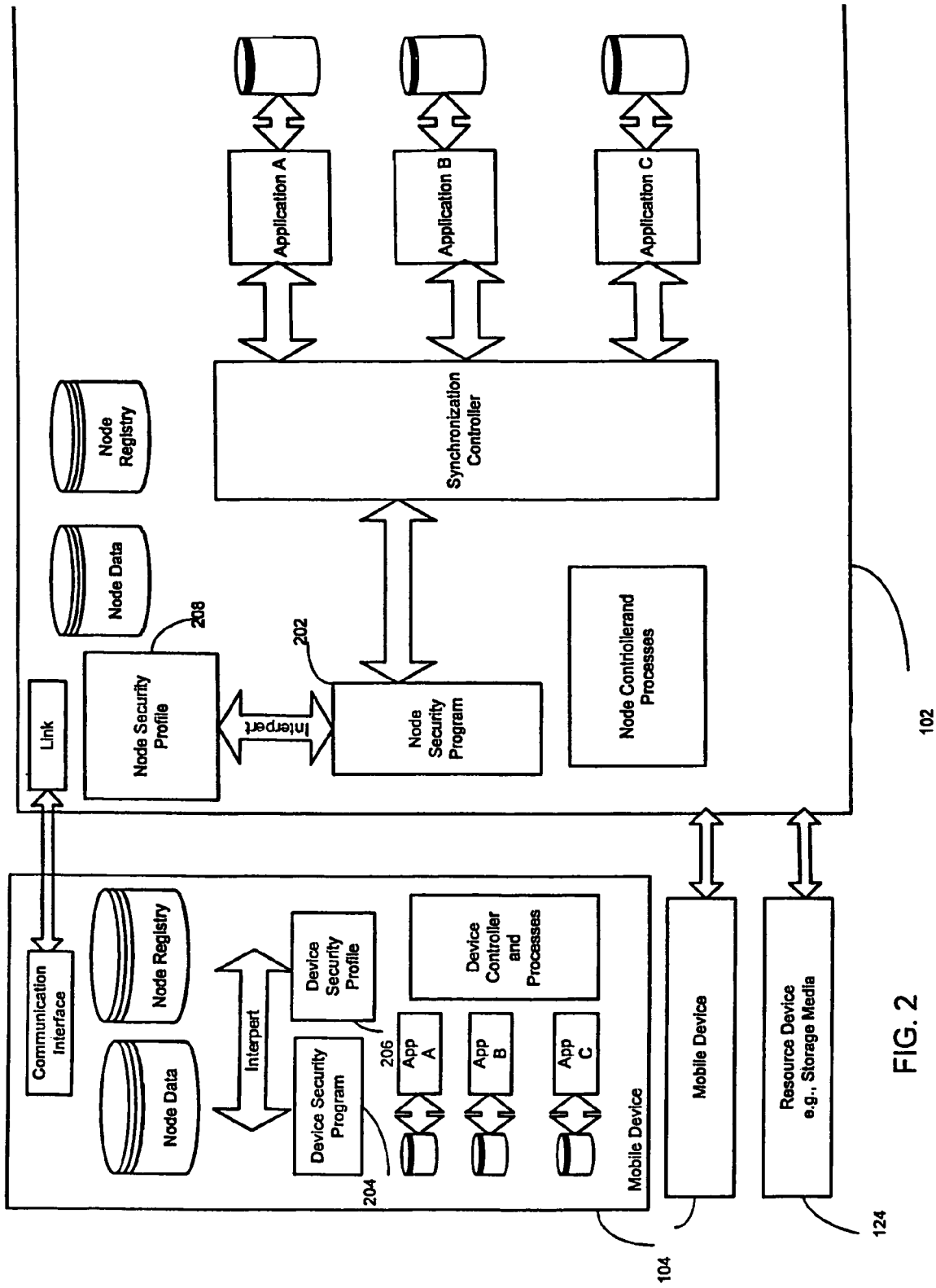
FIG. 2 is a block diagram of a computing node and devices that operate within the system shown in FIG. 1.

Referring to FIG. 2, a block diagram for managing security between the computing node 102, mobile devices 104 and the resource device 124 is shown. The computing node 102 acts as a gateway between the mobile devices 104 and other network resources 124. A node security program or agent 202 is executed in the computing node 102 for interfacing with a corresponding device security program or agent 204 that is executed at the mobile device 104 or resource device 124. The device security program 204 interprets a device security profile 206 to implement mobile device security. The node security program 202 interprets a node security profile 208 to determine one or more security parameters for managing the security between the computing node 102, resource device 124, and mobile devices 104, including controlling transfer of data, files, device profiles, applications, and programs between the computing node 102, resource device 124, and the mobile devices 104. For example, the security parameters derived from interpreting the node security profile 208 may require preventing data synchronization between the mobile device 104 and resource device 124. The node security program 202 can also prevent remote execution, utilization of any application, or file on the mobile device 104 or resources 124. The computing node security program 202 can also enable or disable synchronizing of particular kind of data. For example, the security parameters can specify that address book data of the mobile device 104 cannot be synchronized with the computing node 102.

The information contained in the node security profile 208 can include information that alone or in combination identifies an authorized or unauthorized computing node, an authorized or unauthorized user, an authorized or unauthorized mobile device, an authorized or unauthorized central station, or an authorized or unauthorized network or resource, such as storage devices or a camera. The identity of the mobile device and computing node may be specified by physical address, serial number, model number, device type, server, network resource ID, software license number (registration number), user ID, etc. The authorized or unauthorized computing node can be specified relative to mobile device parameters, such as device type, etc. For example, certain computing nodes 102 may be authorized to synchronize data with certain specified mobile device types, but not authorized to synchronize data with other device types, and vice versa.

As stated above, the computing node 102 can be any type of wired or wireless node, including a client station connected to the security server 106 directly or via a wired or wireless network. Also, the computing node 102 can itself be a mobile device 102 that is responsible for managing security for other mobile devices 104. The node security profile 208 can set user access rights by enabling/disabling or password protecting users' ability to configure the computing node 104 and/or its profile. Depending upon the security parameters set in the node security profile 208, corresponding changes are made to the registry key, file, or database entries of the computing node 102 or its configuration file to enforce the node security profile parameters. Registry key, file, or database entries along with functionality associated with the computing node 102 are used to control and monitor all data synchronization, transfer, access, modification, or execution of files, applications, programs, security profiles and processes that occur through the computing node by any data transport that relates to applications that interface with the devices 104 and 124. The computing node security program 202 can also periodically check, for example, for security profile updates.

A computing node monitoring module in the security station 106 tracks all computing nodes within its network by gathering data on the list of mobile devices that connect to the computing nodes for synchronization and gathers mobile device information on various synchronization and data transfer parameters, e.g., the nature and size of data that was synced, etc. The computing node collects the data along with device specific information from the mobile device for transfer to the security server 106. The server 106 monitors the computing node to determine whether the security of the computing node, and in effect the security of the network, has been compromised. The server 106 may also track data traffic load on the computing nodes to give the administrator information about abnormal traffic patterns that may correspond to unauthorized data transfers. Traffic load analysis may help in effective load balancing.

The device security profile 206 sets the security parameters for the devices 104 and 124, as interpreted by the device security programs 204. The device security parameters include encryption preferences, global (device) password, local (application or resource) password, access control to applications and resources, access control to the device, integrity protection against hackers and traps, file encryption options, port protection, communication protection (i.e., send and receive), ability to use wireless connections like Wi-Fi, 802.11, Bluetooth, controlling the content of the device, like restricting installation of some applications, etc.

Multiple device profiles can be loaded, stored, and transferred to the mobile device from the computing node or the security server. The mobile device itself can be a repository of multiple security profiles. For example, multiple security profiles may be used for handling multiple users that share the mobile device. Each user sharing the mobile device may have a different security and user profile. Only one device profile can be active at a time. As described later in detail, the appropriate profile can become active dynamically based on time, day, date, location, or other attributes that define the "identity status" of the mobile device at the time a connection is made to the computing node. For example, as soon as the mobile device is moved to a secure location, the mobile device activates a device profile that provides security parameters and rules for the secure location.

Creating Security Profiles

The device and node security profiles 206, 208 can be created at the central station 118, the server station 106, or at a computing node 102, using any suitable tool, such those that create .ini, binary, or XML files.

Figure 4:
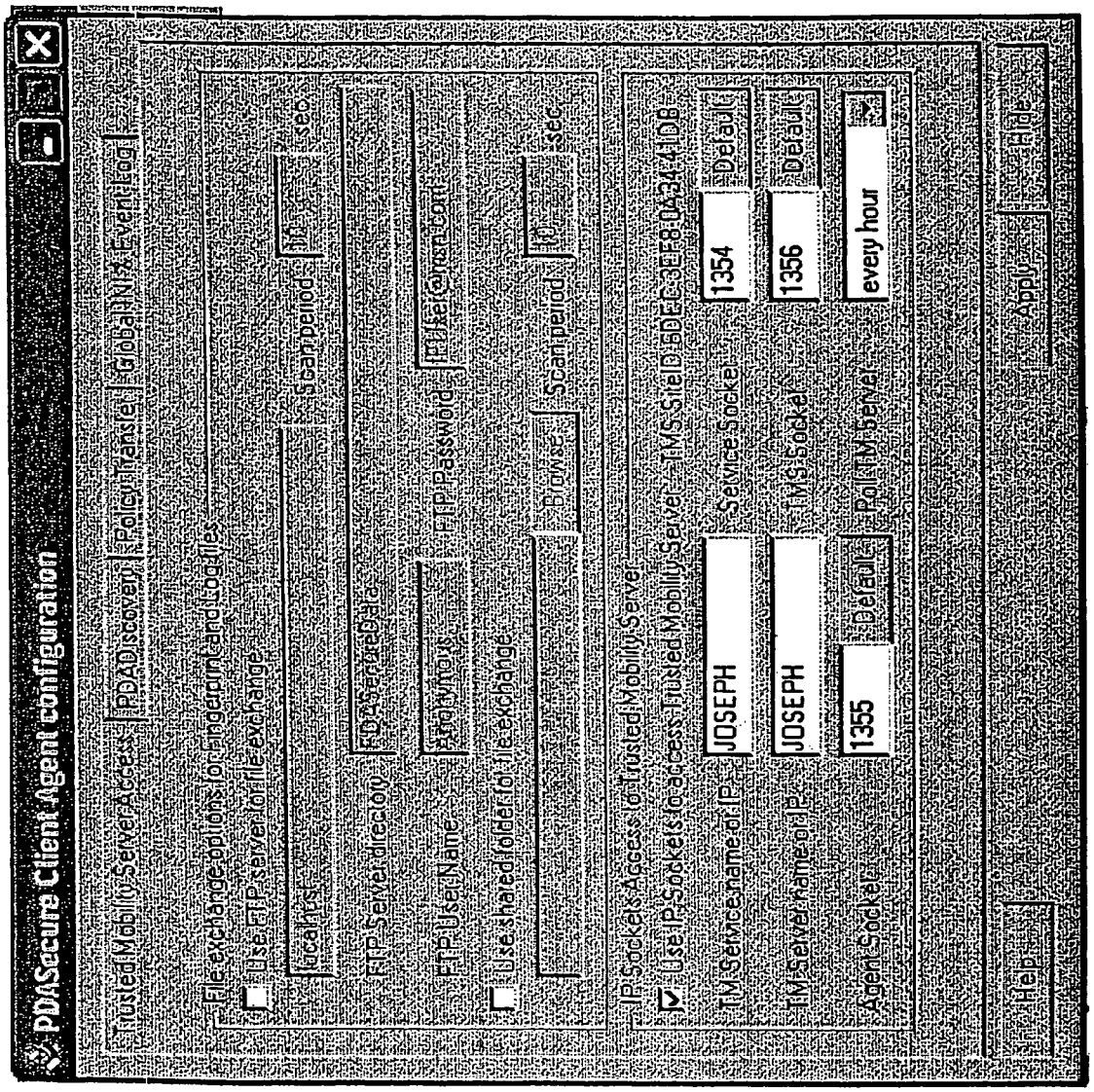
FIG. 4 is an exemplary diagram of an interface for setting security parameters for a computing node.
Figure 6:
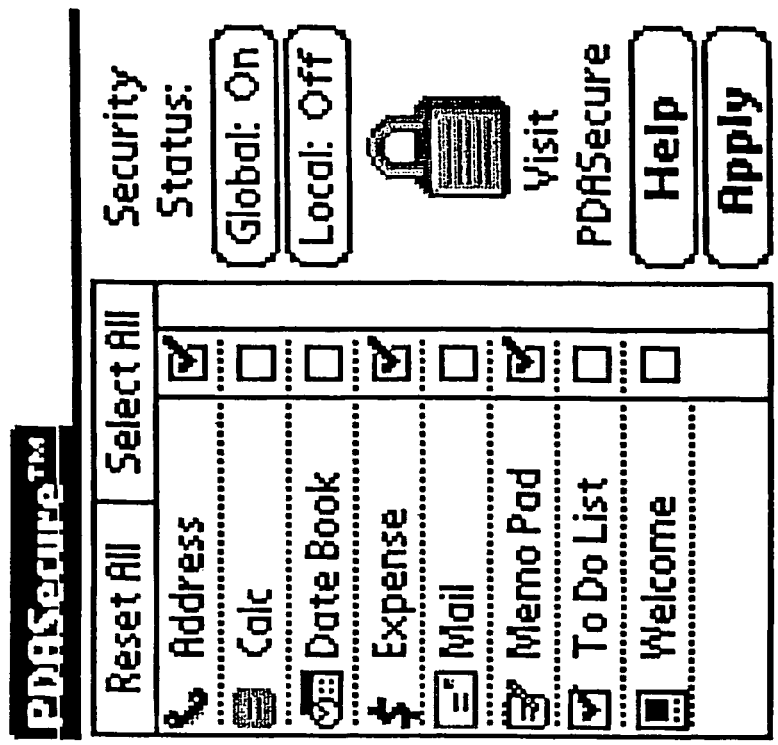
FIG. 6 is a diagram of an interface for setting security parameters in a mobile device.
Figure 5:
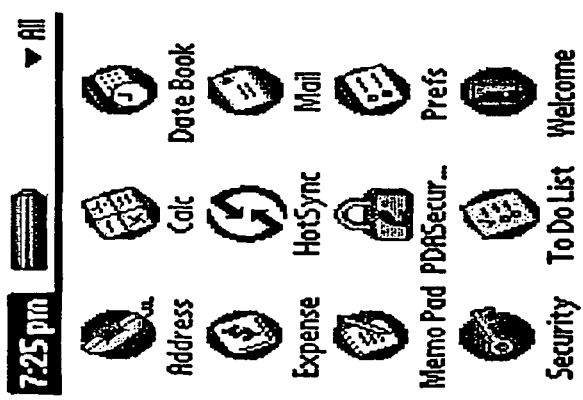
FIG. 5 is a diagram for interfacing with applications in a mobile device.

FIG. 3 shows an exemplary security profile. FIG. 4 illustrates an exemplary interface for setting security parameters for a computing node in accordance with the invention. For example, the server access tab, as illustrated, shows security parameters for communicating with a server. Other shown tabs can be used to set device discovery, security policy transfer and event log parameters. FIG. 5 illustrates an interface on a mobile device for activating various applications. FIG. 6 illustrates an interface for a device security profile that applies security parameters to an "Address" and "Expense" application.

Often, not all information in a security profile needs to be updated. Thus, security profiles can be partitioned into basic security rules and extended security rules. The basic security rules may include password settings, device access settings, etc., whereas extended security rules may include application access settings, data transfer restrictions, communication settings etc. The partitioning of the security profile simplifies creation and transfer of security profiles to mobile devices and computing nodes.

The security of system 100 can be managed based on a central security policy, for example, one promulgated by a network administrator. One or more security profiles can be created defining the governing security rules and parameters according to the central policy. The computing node security profile 208 and the device security profile 206 can be updated periodically by checking one or more designated web/ftp sites or by accessing a central station or server station. In a similar manner, the device security profile 206 can be updated by accessing the computing node 102. The device security program 204 can also automatically request device security profile 206 in real time.

A created policy can be deployed via a wireless transport, for example, Bluetooth. Wireless transmission of security profiles allows the security profile to be updated without requiring the mobile device to physically synchronize with the computing node. This provides the administrator flexibility and control to enforce security restrictions on the user in real time. By encapsulating the security profile in a Multimedia Messaging Service (MMS) message or other similar services, new security profiles may be sent and applied to the mobile device.

Static and Dynamic Security Policy Implementation

Conventionally, a security policy is applied statically. A static security policy implementation applies the same security rules every time the mobile devices connect to the computing nodes.

One aspect of the present invention applies or otherwise enforces the security policy dynamically. More specifically, different security rules and parameters are applied depending on a determined "identity status," which is unique to each mobile device. For example, the identity status of the mobile device can be derived based on collected information that relates to the device itself, its status, configuration, and capabilities, as well as its historical activity, as further described below. As describe later in detail, the unique identity status of the mobile device can be connection specific and determined at the time of connection. The unique identity status of the mobile device is used for preventing intrusion, controlling admission, and access to the network, as well as for enforcing a suitable, consistent, and platform independent security policy across the system. For example, based on the unique identity status of the mobile device access to the computing node or to the network via a wireless network can be prevented.

The identity status of the mobile device can correspond to its essential or generic character in different instances, for example, when it connects to a computing node. Such identity status distinguishes the character or personality of the mobile device from others. As such, the identity status of the mobile device, as determined based on collected information, uniquely characterizes the mobile device based on the attributes of the mobile device. The identity status also corresponds to variant identities, roles, phases or versions of the mobile device as a continuing basic entity, similar to an avatar identity status. This unique identity status of the mobile device is akin to DNA information of an organism that distinguishes it from other organisms, even those of the same type. Similar to the DNA information, the collected information characterizes or identifies different mobile devices. For example, two mobile devices of the same type, e.g., two blackberries, may have their own unique identity status or so called DNA information based on other attributes, e.g., features and capabilities, location, etc. Based on device identity status or DNA information, all cloned devices (mobile devices of the same type) can be detected to apply security profiles that ensure integrity according to a promulgated security policy. Such unique information of the device is also helpful in detecting any device activity and device usage. Also, the collected information can be processed to analyze security vulnerabilities, correlate events, and predict risk. The information regarding the identity status of the mobile device can also be structured for use by other systems. The unique identity status of the mobile device can be represented by various types of indicia, e.g., numbers, characters, names, symbols, etc.

Figure 7:
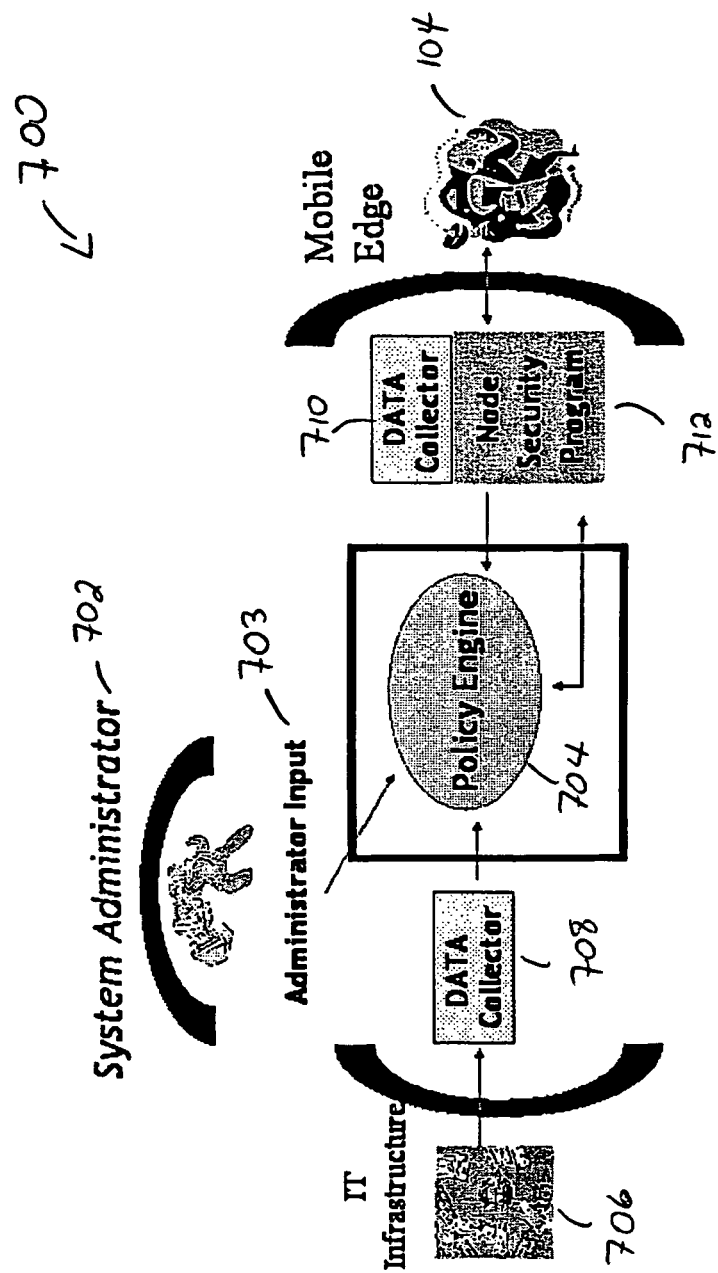
FIG. 7 is a block diagram of an exemplary security system in accordance with the present invention.

Referring to FIG. 7, a block diagram of a mobile edge security architecture 700 in accordance with the present invention is shown. The security policy in the architecture is centrally managed by a system administrator 702, which enforces a unified and cohesive security policy on the mobile devices. The security administrator 702 selects security policy for the network based on standards or varying predetermined event security thresholds. Selections by the security administrator 702 are indicated by an administrator input 703 and transmitted to a security policy engine 704. The security policy engine 704 generates alarms and reports based on information from the network, the mobile devices 104, and the security thresholds to inform the administrator 702 or the security server of the security of the network and any threats being experienced by the network. Also, the security policy engine 704, which runs on either the computing node 102 or security server 106, generates a device security profile according to the security policy and promulgates the device security profile to the mobile device 104. The security policy engine 704 dynamically analyzes the identity status of the mobile device 104 when generating the device security profile. The security policy engine 704 generates corresponding device security profiles based on the unique identity status of each mobile device 104, for example, at a given connection or access to a resource, etc.

The unique identity status of each mobile device 104 is determined based on device specific information collected from various sources in the computing node 102, network 122, IT infrastructure 706, and the mobile device 104. A data collector 708 collects device specific information from sources that are external to the mobile device 104. Data collector 710 collects device specific information from sources that are internal to the mobile device 104. Node Security Program 712 interacts with policy engine 704, mobile device 104, and data collectors 708, 710 for policy enforcement and for data collection. Node security program 712 also interacts with mobile device 104 for intrusion protection, data protection, and end point security.

Data collection at data collectors 708, 710 is initiated independent of the underlying platform that connects the mobile device 104 to the computing node 102. The data collection may be initiated by the computing node 102, the security server 106, or the mobile device 104. The collected information can be classified based on various attributes. Such attributes can be static attributes of the device, which are fixed and not changeable. One example of a static device attribute is Physical Device ID. Conversely, dynamic device attributes are non-fixed, i.e., they are changeable. Examples of dynamic device attributes include installed operating system and applications, which can be changed, if required. Another class of attributes relates to the capabilities of the device and defines its personality, for example, in terms of supported storage devices, peripherals, ports, and I/O capabilities. Information relating storage media, capabilities, and port attributes of the computing node device, e.g., CD-R, Floppy Drive, SD Card, USB, IR, etc, can be collected and analyzed using well known techniques. The analysis also applies to the capabilities and features of the mobile device's operating system, platform, applications, storage, ports, and peripherals, e.g., Bluetooth, IR, USB, phone, camera, etc.

Yet another class of attributes relates to behavior of the mobile device, for example, in terms of its usage patterns. Usage patterns of the device can include specific analysis of usage logs captured on the device, a review of recent device application usage as well as detection of a device reset log from when the device is reset causing erasure or changes to system level software. Reset logs occur when a user either purposefully or accidentally, e.g., when a battery runs out, resets the mobile device.

Information regarding historical mobile device activities and behavior can be collected and analyzed by accessing various internal and external sources, including back-up databases and storage areas. One example of collected information relates to synchronization history of the mobile device, which reflects when data between one or more applications running the mobile device and a computing node is synchronized. This information can be collected from synchronization logs that are maintained within the mobile device or computing node.

The device attributes can also be classified based on location of the device in order to enforce different security profiles in various physical locations. Different positioning technologies, such as, for example, GPS, may be used to determine the location of the mobile device and to enforce the corresponding security profile for that location. In a wireless network, the location of the mobile device may be determined based on the location of the computing node or access point to which the mobile is connected. A number of wireless computing nodes may exist at any location or proximity, e.g., in office, home, city, etc., forming a number of wireless networks, such a server wireless network, a work group wireless network, or a guest wireless network, etc. Accordingly, at one location, a device security program that applies the rules of the device security profile for that location could restrict access only to an authorized wireless network, but not to any other. Similarly, at a different location, another device security profile could restrict all foreign mobile devices to the guest wireless network.

In one embodiment, the location of the mobile device may be obtained from the security server 106 based on which computing node the mobile device is attached. A positioning system may be used to determine the location of the mobile device, the location of the computing node (or access point), or both. Based on the location of the mobile device, the server determines security restrictions for the network and may send a security profile to the mobile device corresponding to that network.

Other collected and classified information includes information on the network in which the mobile device operates, security level, and historical information of the mobile device. Accordingly, this aspect of the invention collects and classifies information that uniquely characterizes a mobile device in terms of a device identity status, which is specific to the mobile device. According to one feature of the present invention, the unique device identity status is used for implementing a platform-independent and dynamic security policy, which is centrally and cohesively applied across the entire system.

The collected information is compiled, categorized, correlated, and updated each time the mobile device connects to the network. By processing and correlating the collected information, the unique identity status of the mobile device is determined. In one exemplary embodiment, the unique identity status of the mobile device is determined when the mobile device connects to the computing node, whereby the identity status is unique to the connection between the mobile device and computing node at the time of connection. The unique identity status can also be determined in any other instances, when the mobile device tries to access a network resource or a communication link. The unique identity status of the mobile device is used for controlling admission and access to the network. If it is determined that the unique identity status of the mobile device allows access to the network, the mobile device is authenticated, for example, by the user entering a correct password.

Once the mobile device is allowed access to the computing node and is authenticated, the policy engine 702 automatically creates and distributes a security profile to the mobile device 104 that corresponds to the unique identity status of the mobile device 104 for the connection. The device security profile is based on the authenticated user and the identity status of the mobile device 104.

Figure 8:
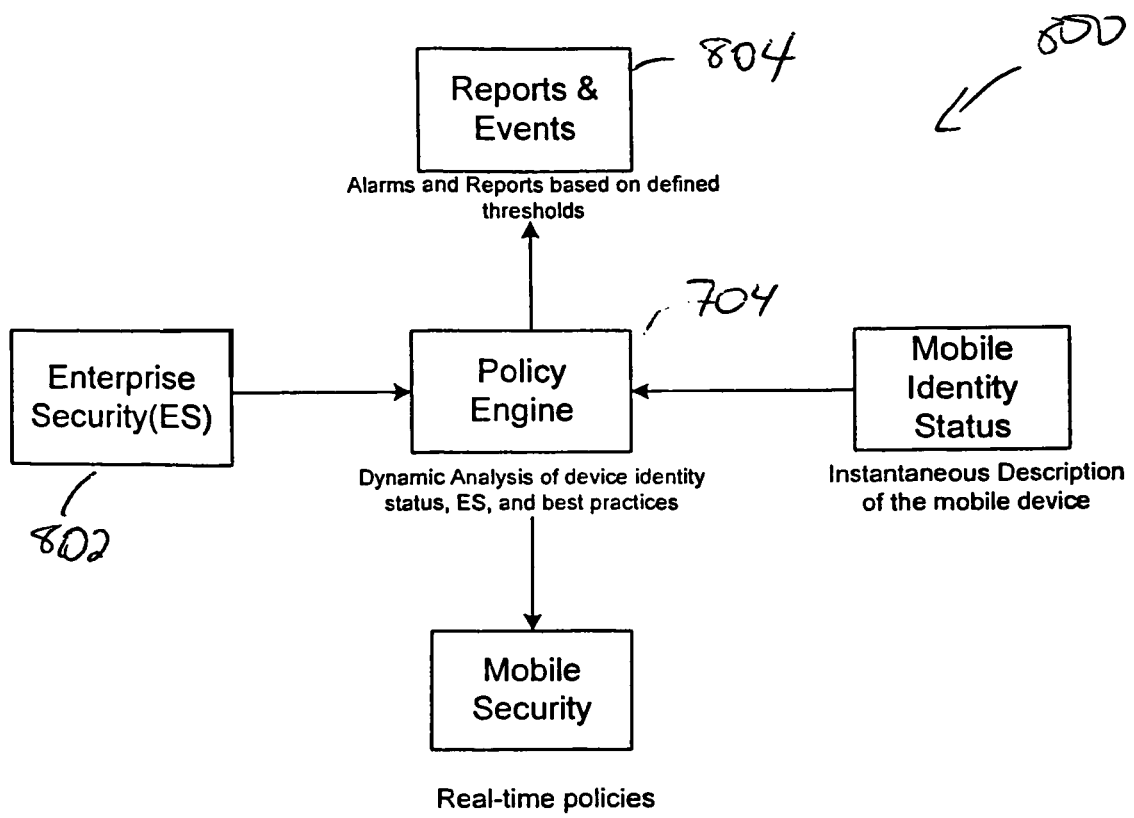
FIG. 8 is a block diagram of network security management using the policy engine.

Referring to FIG. 8, a block diagram illustrates management of network security. The policy engine 704 receives inputs including mobile identity status, and enterprise security 802. The enterprise security 802 includes information from the administrator 702, and other information from the IT infrastructure 706. The policy engine dynamically analyzes the device identity status and the enterprise security to generate real-time policies for mobile device security. The policy engine also uses the information on enterprise security and mobile identity status for reporting and events. Reporting and events include alarms and reports based on defined security thresholds indicating the security of the network.

The device security profile created based on the unique identity status can protect the mobile device in accordance with defined security rules or parameters. The protection can be applied by encrypting data, file, folder, volume, or hard disk. Additionally, the security profile may protect the installed applications in the mobile device by performing an integrity and validity check.

The device security profile created based on the unique identity status of the mobile device can also restrict the capabilities and operation of the mobile device 104. Such device restrictions include limiting access to peripherals, drive, ports, and other capabilities based on the identity status of the mobile device. The applied restrictions could remove access to various resources or password-protect data, applications, or communication links. The restriction can also be applied to protect output data by determining whether or not to encrypt the output data. The applied restriction can also define acceptable/unacceptable devices with which the mobile device can interface.

The device security profile created based on the unique identity status can also configure various features or software in the mobile device, including a firewall, anti-virus software, a virtual private network (VPN), or by downloading and executing other software patches.

The computing node or the mobile device may store a repository of multiple security profiles corresponding to various identity statuses of the mobile device. The multiple security profiles can be stored in the mobile device to enforce different security policies based on time, location, user, role, etc. In one embodiment, the identity status of the mobile device is determined internally by the mobile device itself. For example, the mobile device can determine different identity statuses for itself based on internal resources, such as a clock or GPS receiver, which provide information regarding time and position, respectively. Based on its identity status, the mobile device can apply a corresponding security profile from its own profile repository. For example, if a user is not to access specific applications after a particular time, a restrictive security profile may replace a previous one and deny access to the applications after that time. Alternatively, the mobile device can request a security profile that corresponds to its internally determined identity status from external resources, e.g., the computing node.

Alternatively, the identity status of the mobile device can be determined externally, for example by a computing node or security station. The device security profile corresponding to the identity status can be generated externally and transferred to the mobile device by wire or wireless link. Such externally determined identity status can also be communicated to the mobile device over a link. If the device security profile associated with the communicated identity status is already stored in the mobile device's profile repository, the device security program can retrieve and apply the security profile. Otherwise, the mobile device can send a request to the computing node to receive the device security profile that is associated with the identity status. Once received, the mobile device stores the device security profile for later use.

Control Communication Sessions

With the multitude of available transport technologies, transfer of data to/from a device is relatively easy. An unauthorized mobile device may gain access to the network via wireless access points to steal data or send virus files that corrupt the network. One aspect of the present invention controls access via communication links or use of other resources to prevent unauthorized activity unless authenticated. If, for example, a virus is detected that originates from a particular communications link, this embodiment requires the mobile devices to authenticate themselves before using the communication link to access the network.

Thus, another aspect of the present invention controls access, interface, and use of various wired or wireless communication links, such as the serial connection, Wi-Fi, 802.11, Bluetooth, etc, or other resources. A series of network "sniffers" can be used to scan and detect the use of the communication resources of the system, for example, by detecting the packets that are being communicated from one or more mobile devices over any one of various communication links. Once a mobile device using a particular communication link resource is detected, the mobile device using the link is authenticated before permitting access to the wireless network, for example by a password. By using password authentication, mobile devices misusing the system resources can be identified and held responsible. Additionally, the computing node or security server may also log the usage details of the resources by the authenticated mobile device, including the time and duration of usage.

After password authentication, the security server generates a device security profile for the authenticated mobile device that controls access to the resources. Varying levels of access can be provided to the authenticated mobile device, as defined by the generated device security profile. The device security profile transmitted to the mobile device defines access and resource usage rules, for example, whether the mobile device may synchronize with computing nodes within the network, what kind of data/files the mobile device may be allowed to synchronize with, or the maximum file size allowed for synchronization, etc. This feature allows the administrator to password protect the resources and limit the access only to the authenticated mobile devices. Besides communication resources, other resources can also be password protected, including access to information stored on a network server, or other storage devices and peripherals, including, for example, a data storage device.

Remotely Unlocking a Password Protected Mobile Device

Conventionally, when a user forgets a password for a mobile device, the mobile device cannot be unlocked or accessed without losing the data on the mobile device. According to another aspect of the invention, a password protected mobile device is unlocked without loss of data by authenticating the user and the mobile device. In one embodiment, the user is authenticated by biometric means, e.g., fingerprint or via a secure ID. In another embodiment, the user provides response to one or more queries that authenticate the user. The mobile device is authenticated by an authentication code that is generated based on a physical attribute of the device and a code associated with the security station. Once the user authentication response and the device authentication code are verified, an unlock code is generated that is used to unlock the password protected mobile device to allow access to the device. Verification of the user authentication response and the device authentication code requires communicating them either to the user, e.g., verbally or textually, or by the mobile device automatically. The communicated user authentication response and the device authentication code can be directed to the security station or a network administrator, as the case may be. Similarly, the generated unlock code can be communicated by the administrator to the user or by the security station to the mobile device. The unlock code can be communicated to the mobile device automatically or verbally.

The user authentication queries and answers are created based on information that is known to the user and not to the general public. For each user, the authentication queries and answers are stored in the security database 120 for access by the security server 106 or the administrator. In one exemplary embodiment, each user is allowed to create their own authentication queries and answers in terms of one or more questions and corresponding answer sets using an appropriate interface. Questions in the user defined question set may include mother's maiden name, social security number, state identification card information, favorite pet's name/sports team, or any other personal information or non-personal information that authenticates the user. The authentication queries and answer set may also be stored locally at the mobile device, or may be received from the computing node or the security server.

The user responses are communicated via a wired/wireless links for verification by the security server 106. Alternatively, the user may call the administrator using the telephone network to respond to the query. The responses may also be communicated via an interface, e.g., a website, and be transmitted to the security server 106 to authenticate the user.

The device authentication code is generated based on a series of device attributes, such as the serial number of the mobile device. In another embodiment, the device authentication code can be generated based on calculations that also take into account other parameters, such as the current time. This authentication code is generated by first receiving a device specific code either manually read to the administrator or provided via wired or wireless communications. Upon receipt of this code, the server applies a set of known algorithms to produce a second number, which for a specified time period if entered into the mobile device will unlock the device. This second number can be read manually to the user for entry, or it could be sent via wired or wireless networks. In one embodiment, the device authentication code is encrypted based on the security station 106 identification code. The device authentication code is then transferred in real-time or non-real-time to the security station 106. Alternatively, the device authentication code can be displayed to the user, and the user can communicate the code to the server or administrator via telephone. After receiving the device authentication code, the security server or administrator may then verify the encrypted code to authenticate the mobile device.

After successful authentication of both the user and the mobile device, the security server 106 or administrator generates the unlock code. The unlock code can be a user password for the mobile device, a default password code for unlocking the mobile device, or a default reset code allowing the user to reset the password of the mobile device. As an additional feature, the unlock code may be time sensitive and expire if not entered into the mobile device within a specified amount of time.

Upon receipt, the unlock code may automatically unlock the mobile device without further user input. Alternatively, the administrator may convey the unlock code to the user over the telephone for manual input at the mobile device, or textually via the Internet. Upon entry of the unlock code, a security program on the mobile device unlocks the mobile device to allow the user access to the mobile device.

Control Application Usage and Install

According to a further aspect of the present invention, the device security program controls the mobile device according to a device security profile that governs the use and installation of unauthorized resources, including installed applications. Application programs may be computer programs for individual use by the mobile device, such as, for example, an audio program, or they may be computer programs that access external resources, such as, an information server or other computing nodes.

More specifically, when a mobile device attempts to connect to a computing node, the mobile device is authenticated.

After authentication, the mobile device receives a device security profile from the server or computing node and activates a device security program. Upon activation, the device security program may identify and list all of the applications, files, and resources that are available on the mobile device, and control the mobile device according to the parameters of the security profile.

After identifying the installed application programs, the unauthorized installed application programs are detected, as determined from the device security profile. Once detected, the security program can delete the unauthorized installed application program, hard or soft reset the mobile device, lock the mobile device, prevent the unauthorized installed application from running, delete one or more files associated with the unauthorized installed application program, or hide the unauthorized installed application program. For example, if the user is connected to a wireless network at a library, the device security program may allow a user to connect to the Internet, but may prevent the user from activating an audio program.

Similarly, after connecting to the computing node, the user may attempt to access application programs from local or remote information resources or install various application programs received via e-mail on the mobile device. The device security program uses the device security profile to determine if installation or access to any of these application programs is allowed. If not, the device security program may prevent or stop the installation of the application program.

An administrator may select allowed or restricted access to the application programs or resources for a particular network by setting a security policy with rules for installation or usage by each mobile device within the network. The administrator, or alternatively a security server, can control the installation of application programs and its usage for all mobile devices that operate within the system. For example, based on the security policy, a security profile for each mobile device connecting to computing nodes of a corporate network can be created. The security profile sets the security rules for the mobile device based a mobile device attribute and/or the user.

The device security program controls application usage and installation according to the security rules of the device security profile, either statically or dynamically, as described above. Under this arrangement, the computing node security program of the computing node can control usage and installation of mobile device applications while the mobile device is connected to the computing node.

The device security profile can also define rules associated with interfacing with unauthorized internal or external resources. The unauthorized external resource can be a computing node resource, an external application program, an external database, and an e-mail server, among others containing proprietary information. The unauthorized internal resources can be an internal camera. According to this embodiment, the device security profile can prevent access to the unauthorized internal or external resources, prevent installation of the unauthorized internal or external resources, and prevent interface or communication with the unauthorized internal or external resources.

The device security program prevents the mobile device from accessing or using unauthorized internal or external resources according to the rules of the device security profile. As an example, the device security profile may prevent the user from using the internal camera in an art gallery. In another example, the device security profile may give the user the right to access promotional data of a company's product from a wireless corporate network, but restrict the mobile device from accessing engineering designs of the product or from accessing devices that may be used to test the product. Additionally, the security profile may protect the corporate network by preventing the mobile device from sending a restricted application program within the network.

Request Based Security Profile Creation

According to still another aspect, a mobile device can request a device security profile for protecting the mobile device from an imminent security threat, such as a virus attack. After receiving the request from the mobile device, the security server may respond by transmitting a suitable device security profile that prevents or lessens the effect of the virus threat. As such, the mobile device may dynamically adjust to various types of network security threats.

If a probability of an attack is seen, then the device security program on the mobile device may request a security profile that provides appropriate protection. The request may include information related to attributes of the mobile device, for example, information on a communication link used by the mobile device, a serial number of the mobile device, or any other information identifying software or hardware on the mobile device. The mobile device attribute information can also include active directory information, for example, firewall settings of the mobile device, current security settings of the mobile device, security parameters, or other security settings of the mobile device.

The request for the security profile may be sent from the mobile device using TCP/IP or any communication connection over any available transport media. A security profile generation module is activated upon receipt of the security profile request from the mobile device to create an appropriate device security profile. The resultant security profile may be transmitted to the mobile device using the same transport media on which the request is received or any alternative transport media.

Unified Login for Mobile Devices

According to another aspect of the invention, the login information is unified between the mobile device and computing node to prevent the need for using multiple login information. This feature eliminates the need to remember multiple passwords for both the mobile device and the computing node. When a user selects new computing node login information, the computing node transmits the new computing node login information to the mobile device. According to one feature of this aspect of the present invention, the new computing node login is transmitted via a device security profile. The mobile device retrieves the new computing node login information from the device security profile and sets it as its new login information. The new computing node login information can be a new password for the computing node. Alternatively, the new login information can be a network login. If so, the new login information is transmitted to the security server. When received, the security server changes the old network login to the new one and transmits the new login information to the mobile device in a device security profile that applies the change to the mobile device.

The present embodiment also allows the user to change the password information on their computing node, e.g., a personal computer, and to update the mobile device with the changed password through an updated security profile. When the user changes the password at the computing node, the change is transmitted across the network to update the login information database. After updating the password of the computing node in the database, the server receives notification of the updated network login information and automatically sends an updated device security profile to the mobile device. Alternatively, the server may transmit an updated device security profile to the mobile device at the next time the mobile device connects to the network. The updated security profile may contain the network login information so that the computing node and the mobile device use the same password for network access, thereby preventing the need for the user having to use multiple passwords.

The user may use network login information to log on to the network using a mobile device connected to or disconnected from a computing node. Conventionally, a mobile device cannot directly access the corporate network login information without being connected to a computing node. The mobile device of the present invention may be disconnected from the computing node, but may still access the network using the unified login information, which is used to access the mobile device.

Security Signature Files

Mobile devices that connect to computing nodes can have different operations and functionalities. As newer mobile devices enter the market the range of operations and functionalities expands making them hard to track. Such expanded range of functionalities often impact security program or profiles, such that security programs and profiles developed for the previous versions become obsolete. To support the newer versions of the mobile devices, different security programs and different types of security profile may be necessary. The device can be identified based on it behavior and capabilities and make use it will have a unique signature that can be used for tracking within our system.

In order to eliminate the need for replacing the older version security programs and profiles, the present invention uses security signature files to accommodate newer versions of mobile devices that enter the market. The security signature file may, for example, identify a mobile device model, a mobile device manufacturer, and other information specific to the mobile device model and manufacturer.

The security signature file that contains various device parameters of the different devices and the modifications that need to be made to correctly set the rules, when a device parameter is changes added or deleted. Device parameters may include, for example, a serial number, security settings, manufacturer, model, or any other information that may identify the device. The computing node security program may periodically check the server program for updated signature files, or the server may automatically send updated files to the computing node.

Therefore, a system and method for securing a computing node that connects to different mobile devices applies security rules to the different mobile devices in accordance with corresponding device parameters contained in a security signature file. The device parameters include serial number, security settings, manufacturer, model number, etc. When a change in device parameters is detected, the security rules applied to the mobile device are modified in accordance with one or more device parameter of an updated security signature file at the computing node.

The embodiments and examples discussed herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. A method, comprising:
   collecting, from a source, information characterizing attributes of a mobile device at a particular instance;
   based on the collected information, determining, using at least one processor device, an identity status for the mobile device that is unique to the mobile device and distinguishes it from other mobile devices in a set of mobile devices, the identity status corresponding to a set of the attributes characterized in the collected information, the set of attributes including at least one static attribute of the mobile device and at least one dynamic attribute of the mobile device, wherein the static attribute is a fixed attribute of the mobile device and relates to a physical device identification of the mobile device, and the dynamic attribute is a changeable attribute of the mobile device and relates to a security policy for the mobile device;
   determining a particular security profile based on the identity status of the mobile device, wherein the particular security profile corresponds to the attributes of the mobile device at the particular instance and includes:
      a first parameter identifying, for the mobile device, that at least one resource internal to the mobile device is unauthorized, and
      a second parameter identifying, for the mobile device, that at least one resource external to the mobile device is unauthorized; and
   applying the security profile to the mobile device, wherein collected information characterizing attributes of the mobile device at a second instance is used to determine a second identity status for the mobile device that is unique to the mobile device, corresponds to the attributes of the mobile device at the second instance, and is used to determine that a second security profile is to be applied to the mobile device at the second instance based on the second identity status.

2. The method of claim 1, wherein the source is at least one of an internal source to the mobile device or external source to the mobile device.

3. The method of claim 2, wherein the source is a back-up source.

4. The method of claim 1, wherein the identity status of the mobile device is determined internal to the mobile device or external to the mobile device.

5. The method of claim 1, wherein the static attribute of the mobile device comprises an attribute relating to at least one of device manufacturer, device model number, device serial number, input-output port, and a device capability.

6. The method of claim 1, wherein the dynamic attribute of the mobile device comprises an attribute that relates to at least one of installed operating system, application, attached peripheral, usage pattern, historical activity, synchronization, location, network, communication link, domain, and a connection attribute between the mobile device and computing node.

7. The method of claim 1, wherein the device security profile includes a parameter relating to at least one of protection of the mobile device, restriction on use of a resource, and configuration of a resource.

8. The method of claim 1, wherein the identity status of the mobile device is determined when the mobile device connects to a computing node source or when the mobile device accesses a resource.

9. The method of claim 1, further including controlling the mobile device according to a parameter in the particular security profile that relates to an unauthorized resource in the mobile device.

10. The method of claim 9, wherein controlling the mobile device comprises at least one of deleting the unauthorized resource, hard or soft resetting the mobile device, locking the mobile device, preventing the unauthorized resource from running on the mobile device, deleting one or more files that are associated with the unauthorized resource, and hiding the unauthorized resource.

11. The method of claim 1, further including controlling the mobile device according to a parameter that relates to an unauthorized external resource.

12. The method of claim 11, wherein the unauthorized external resource comprises at least one of a computing node resource, an external application program, and an external database.

13. The method of claim 1, wherein corresponding device security profiles for different identity statuses of the mobile device are administered by a security policy engine.

14. The method of claim 1, wherein the particular security profile is transferred to the mobile device after access to the computing node is granted.

15. The method of claim 14, wherein the particular security profile is transferred wirelessly.

16. A method, comprising:
using at least one processor device to collect information from a plurality of different mobile devices, wherein the information characterizes attributes of the plurality of different mobile devices including one or more static attributes of the mobile devices and one or more dynamic attributes of the mobile devices, wherein each static attribute is a fixed attribute and relates to a physical device identification of the mobile devices, and each dynamic attribute is a changeable attribute and relates to a security policy for the mobile devices;
determining, for each of the plurality of different mobile devices, a respective identity status, wherein each identity status is determined based on at least a portion of the collected information, is unique to the corresponding mobile device distinguishing it from other mobile devices in the plurality of mobile devices, and corresponds to to one or more of the attributes characterized in the collected information, wherein a first identity status of a particular one of the plurality of different mobile devices is determined at a first instance;
applying security rules to the different mobile devices in accordance with corresponding device parameters contained in a security signature file;
determining a second identity status of the particular mobile device unique to the particular mobile device and corresponding to collected information characterizing attributes of the particular mobile device at the second instance;
detecting a change in at least one of the device parameters of the particular mobile device from the second identity status; and
modifying the security rules applied to the particular mobile device at a computing node in accordance with one or more device parameters of an updated security signature file,
wherein the security policy includes a first parameter associated with a first unauthorized resource in the particular mobile device, and a second parameter associated with a second unauthorized resource external to the particular mobile device.

17. The method of claim 16, wherein the one or more device parameters comprise at least one of a serial number, security settings, manufacturer, and a model number.

18. At least one non-transitory, machine accessible storage medium having instructions stored thereon, the instructions when executed on a machine, cause the machine to:
collect, from a source, information characterizing attributes of a mobile device at a particular instance;
determine, based at least in part on the collected information, an identity status for the mobile device that is unique to the mobile device and distinguishes it from other mobile devices in a set of mobile devices, wherein the identity status is to correspond to a set of the attributes characterized in the collected information, the set of attributes is to include at least one static attribute of the mobile device and at least one dynamic attribute of the mobile device, the static attribute is to be a fixed attribute of the mobile device and relate to a physical device identification of the mobile device, and the dynamic attribute is to be a changeable attribute of the mobile device and relate to a security policy for the mobile device;
determine a particular security profile based on the identity status of the mobile device, wherein the particular security profile is to correspond to the attributes of the mobile device at the particular instance and include:
a first parameter to identify, for the mobile device, that at least one resource internal to the mobile device is unauthorized, and
a second parameter to identify, for the mobile device, that at least one resource external to the mobile device is unauthorized; and
apply the security profile to the mobile device, wherein information characterizing attributes of the mobile device at a second instance is to be used to determine a second identity status for the mobile device that is unique to the mobile device, corresponds to the attributes of the mobile device at the second instance, and is to be used to determine that a second security profile is to be applied to the mobile device at the second instance based at least in part on the second identity status.

19. At least one non-transitory, machine accessible storage medium having instructions stored thereon, the instructions when executed on a machine, cause the machine to:
collect information from a plurality of different mobile devices, wherein the information is to characterize attributes of the plurality of different mobile devices including one or more static attributes of the mobile devices and one or more dynamic attributes of the mobile devices, wherein each static attribute is to be a fixed attribute and relate to a physical device identification of the mobile devices, and each dynamic attribute is to be a changeable attribute and relate to a security policy for the mobile devices;
determine, for each of the plurality of different mobile devices, a respective identity status, wherein each identity status is to be determined based on at least a portion of the collected information, is to be unique to the corresponding mobile device distinguishing it from other mobile devices in the plurality of mobile devices, and correspond to to one or more of the attributes characterized in the collected information, wherein a first identity status of a particular one of the plurality of different mobile devices is to be determined at a first instance;
apply security rules to the different mobile devices in accordance with corresponding device parameters contained in a security signature file;
determine a second identity status of the particular mobile device that is to be unique to the particular mobile device and correspond to collected information that characterizes attributes of the particular mobile device at the second instance;

detect a change in at least one of the device parameters of the particular mobile device from the second identity status; and modify the security rules applied to the particular mobile device at a computing node in accordance with one or more device parameters of an updated security signature file, wherein the security policy is to include a first parameter associated with a first unauthorized resource in the particular mobile device, and a second parameter associated with a second unauthorized resource external to the particular mobile device.

* * * * *